US006801954B1

United States Patent
Rust et al.

(10) Patent No.: US 6,801,954 B1
(45) Date of Patent: Oct. 5, 2004

(54) METHOD AND APPARATUS TO CONCURRENTLY OPERATE ON MULTIPLE DATA MOVEMENT TRANSACTIONS IN A DISK ARRAY SUBSYSTEM

(75) Inventors: Robert A. Rust, Boise, ID (US); Barry J. Oldfield, Boise, ID (US); Christine Grund, Meridian, ID (US); Christopher W. Johansson, Horseshoe Bend, ID (US); Steven Lee Shrader, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/515,046

(22) Filed: Feb. 25, 2000

(51) Int. Cl.[7] ................................................ G06F 3/00
(52) U.S. Cl. ............................ 710/7; 710/20; 710/21; 710/52; 709/207
(58) Field of Search ........................ 710/7, 21, 20, 710/52; 709/207

(56) References Cited

U.S. PATENT DOCUMENTS

| | | | |
|---|---|---|---|
| 5,392,244 A | | 2/1995 | Jacobson et al. |
| 5,638,531 A | * | 6/1997 | Crump et al. ............... 711/123 |
| 5,687,390 A | * | 11/1997 | McMillan, Jr. ................ 710/5 |
| 5,699,510 A | | 12/1997 | Petersen et al. |
| 5,812,803 A | * | 9/1998 | Pawlowski et al. ......... 710/305 |
| 5,983,326 A | * | 11/1999 | Hagersten et al. .......... 711/147 |
| 6,108,735 A | * | 8/2000 | Pawlowski ................... 710/107 |
| 6,122,723 A | * | 9/2000 | Day et al. ...................... 712/29 |
| 6,157,962 A | * | 12/2000 | Hodges et al. ................. 710/1 |
| 6,240,479 B1 | * | 5/2001 | Snyder et al. ............... 710/113 |
| 6,260,096 B1 | * | 7/2001 | Eskandari et al. .......... 710/310 |
| 6,298,407 B1 | * | 10/2001 | Davis et al. ................. 710/314 |
| 6,421,760 B1 | * | 7/2002 | McDonald et al. ......... 711/114 |
| 6,425,041 B1 | * | 7/2002 | Klein .......................... 710/306 |
| 6,484,248 B1 | * | 11/2002 | Wen ............................ 711/202 |
| 6,549,964 B1 | * | 4/2003 | Lai et al. ..................... 710/107 |

OTHER PUBLICATIONS

PCI Local Bus Specification, Revision 2.2, Dec. 18, 1998, PCI Special Interest Group, pp. 1–302.

* cited by examiner

*Primary Examiner*—Jeffrey Gaffin
*Assistant Examiner*—Eron Sorrell (57) ABSTRACT

A controller is presented comprising one or more initiators coupled to one or more targets via a transaction bus and a corresponding number of data busses. The initiator(s) receive transaction requests from external logic, buffer the transaction and assign it a unique identifier, which is passed to an appropriate target via the transaction bus. The targets receive and queue the unique identifier until it can process the transaction, at which time it prompts the initiator to provide it the buffered transaction via a data bus dedicated to the target.

41 Claims, 6 Drawing Sheets

METHOD AND APPARATUS TO CONCURRENTLY OPERATE ON MULTIPLE DATA MOVEMENT TRANSACTIONS IN A DISK ARRAY SUBSYSTEM

TECHNICAL FIELD

This invention relates to data storage systems, such as hierarchical RAID (Redundant Array of Inexpensive Disks) data storage systems. More particularly, this invention relates to a method and apparatus to concurrently operate on multiple data movement operations in a disk array subsystem.

BACKGROUND

Conventional disk array data storage systems have multiple storage disk drive devices that are arranged and coordinated to form a single mass storage system. The common design goals for these mass storage systems include low cost per megabyte, high input/output performance, and high data availability. Data availability involves the ability to access data stored in the storage system while ensuring continued operation in the event of a disk or component failure. Data availability is typically ensured through the use of redundancy where data, or relationships among data, are stored in multiple locations on the storage system. In the event of failure, redundant data is retrieved from an operable portion of the system and used to regenerate the original data that is lost due to the component failure.

There are two common methods for storing redundant data on disk drives: mirror and parity. In mirror redundancy, data is duplicated and stored in two separate areas of the storage system. In parity redundancy, redundant data is stored in one area of the storage system, but the size of the redundant storage area is less than the remaining storage space used to store the original data.

RAID (Redundant Array of Independent Disks) storage systems are disk array systems in which part of the physical storage capacity is used to store redundant data. RAID systems are typically characterized as one of six architectures, enumerated under the acronym RAID. A RAID 0 architecture is a disk array system that is configured without any redundancy. Since this architecture is really not a redundant architecture, RAID 0 is often omitted from a discussion of RAID systems.

A RAID 1 architecture involves storage disks configured according to mirror redundancy. Original data is stored on one set of disks and a duplicate copy of the data is kept on separate disks. The RAID 2 through RAID 5 architectures all involve parity-type redundant storage. Of particular interest, a RAID 5 system distributes data and parity information across all of the disks. Typically, the disks are divided into equally sized address areas referred to as "blocks". A set of blocks from each disk that have the same unit address ranges are referred to as "stripes". In RAID 5, each stripe has N blocks of data and one parity block which contains redundant information for the data in the N blocks.

In RAID 5, the parity block is cycled across different disks from stripe-to-stripe. For example, in a RAID 5 system having five disks, the parity block for the first stripe might be on the fifth disk; the parity block for the second stripe might be on the fourth disk; the parity block for the third stripe might be on the third disk; and so on. The parity block for succeeding stripes typically "precesses" around the disk drives in a helical pattern (although other patterns are possible). RAID 2 through RAID 4 architectures differ from RAID 5 in how they compute and place the parity block on the disks.

A hierarchical data storage system permits data to be stored according to different techniques. In a hierarchical RAID system, data can be stored according to multiple RAID architectures, such as RAID 1 and RAID 5, to afford tradeoffs between the advantages and disadvantages of the redundancy techniques.

U.S. Pat. No. 5,392,244 to Jacobson et al., entitled "Memory Systems with Data Storage Redundancy Management", describes a hierarchical RAID system that enables data to be migrated from one RAID type to another RAID type as data storage conditions and space demands change. This patent, which is assigned to Hewlett-Packard Company, describes a multi-level RAID architecture in which physical storage space is mapped into a RAID-level virtual storage space having mirror and parity RAID areas (e.g., RAID 1 and RAID 5). The RAID-level virtual storage space is then mapped into an application-level virtual storage space, which presents the storage space to the user as one large contiguously addressable space. During operation, as user storage demands change at the application-level virtual space, data can be migrated between the mirror and parity RAID areas at the RAID-level virtual space to accommodate the changes. For instance, data once stored according to mirror redundancy may be shifted and stored using parity redundancy, or vice versa. The '244 patent is hereby incorporated by reference to provide additional background information.

With data migration, the administrator is afforded tremendous flexibility in defining operating conditions and establishing logical storage units (or LUNs). As one example, the RAID system can initially store user data according to the optimum performing RAID 1 configuration. As the user data approaches and exceeds 50% of array capacity, the disk array system can then begin storing data according to both RAID 1 and RAID 5, and dynamically migrating data between RAID 1 and RAID 5 in a continuous manner as storage demands change. At any one time during operation, the data might be stored as RAID 1 or RAID 5 on all of the disks. The mix of RAID 1 and RAID 5 storage changes dynamically with the data I/O (input/output). This allows the system to optimize performance versus an increasing amount of user data.

To facilitate this intelligent memory management, RAID systems typically include a controller with logic to control such operations. One of the limitations of prior art controllers, however, is that they are general purpose controllers that have been programmed to carry out the management tasks. Accordingly, the RAID system is subject to the physical limitations of the available controllers. Some common limitations of prior art RAID controllers include serial processing on all external interfaces, i.e., a First-In First-Out (FIFO) approach, no means by which high-priority transactions can be identified or expedited, and it is often difficult to accommodate multiple clock domains.

Thus, a RAID controller that is not encumbered by the limitations commonly associated with prior art RAID systems is required. One such solution is provided herein.

SUMMARY

The present invention is drawn to a method and apparatus to concurrently operate on multiple data movement operations in a disk array subsystem.

According to one embodiment, a disk controller is presented comprising one or more initiators coupled to one or more targets via a transaction bus and a corresponding number of data busses. The initiator(s) receive transaction requests from external logic, buffer the transaction and assign it a unique identifier, which is passed to an appropriate target via the transaction bus. The targets receive and queue the unique identifier until it can process the transaction, at which time it prompts the initiator to provide it the buffered transaction via a data bus. It is to be appreciated that decoupling the processing in this way enables an initiator to service multiple targets independently of one another.

According to one aspect of the invention, the initiator utilizes one or more buffers to store transaction information destined for, or received from, targets. It will be appreciated that the use of such buffers enables the controller to accommodate multiple clock speeds associated with various input/output (I/O) communication media coupled to the controller. In this regard, the innovative controller facilitates data movement across clock synchronization boundaries to support the clock requirements of these different I/O ports.

These and other innovative aspects of the present invention will be evident from the description to follow.

BRIEF DESCRIPTION OF THE DRAWINGS

The same reference numbers are used throughout the figures to reference like components and features.

DETAILED DESCRIPTION

Figure 1:
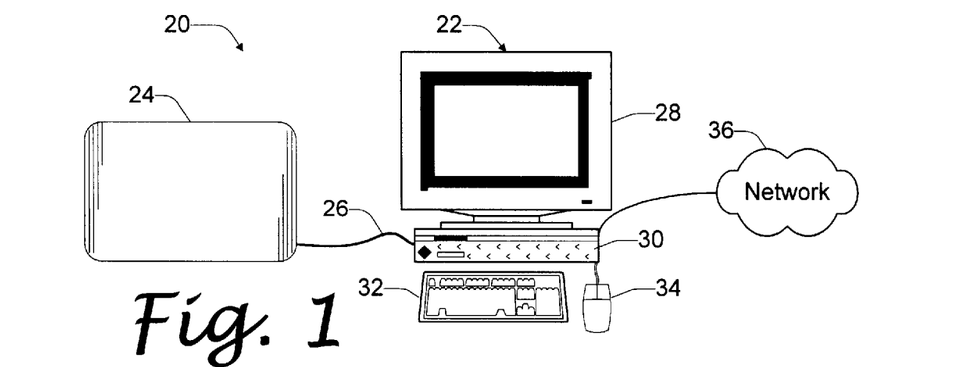
FIG. 1 is a diagrammatic illustration of a host computer connected to a data storage system.

FIG. 1 shows a computer system 20 having a host computer 22 connected to a data storage system 24 via an I/O interface bus 26. Host computer 22 is a general purpose computer that can be configured, for example, as a server or workstation. Computer 22 has a visual display monitor 28, a central processing unit (CPU) 30, a keyboard 32, and a mouse 34. Other data entry and output peripherals may also be included, such as a printer, tape, CD-ROM, network interfaces, and so forth. In FIG. 1, the host computer 22 is coupled to a network 36 to serve data from the data storage system 24 to one or more clients (not shown).

The data storage system 24 holds user data and other information. In the preferred implementation, the data storage system 24 is a hierarchical RAID system that is capable of storing data according to different redundancy schemes. The host computer 22 provides an interface for an administrator to configure the memory space in the RAID system 24, run diagnostics, evaluate performance, and otherwise manage the RAID storage system.

Figure 2:
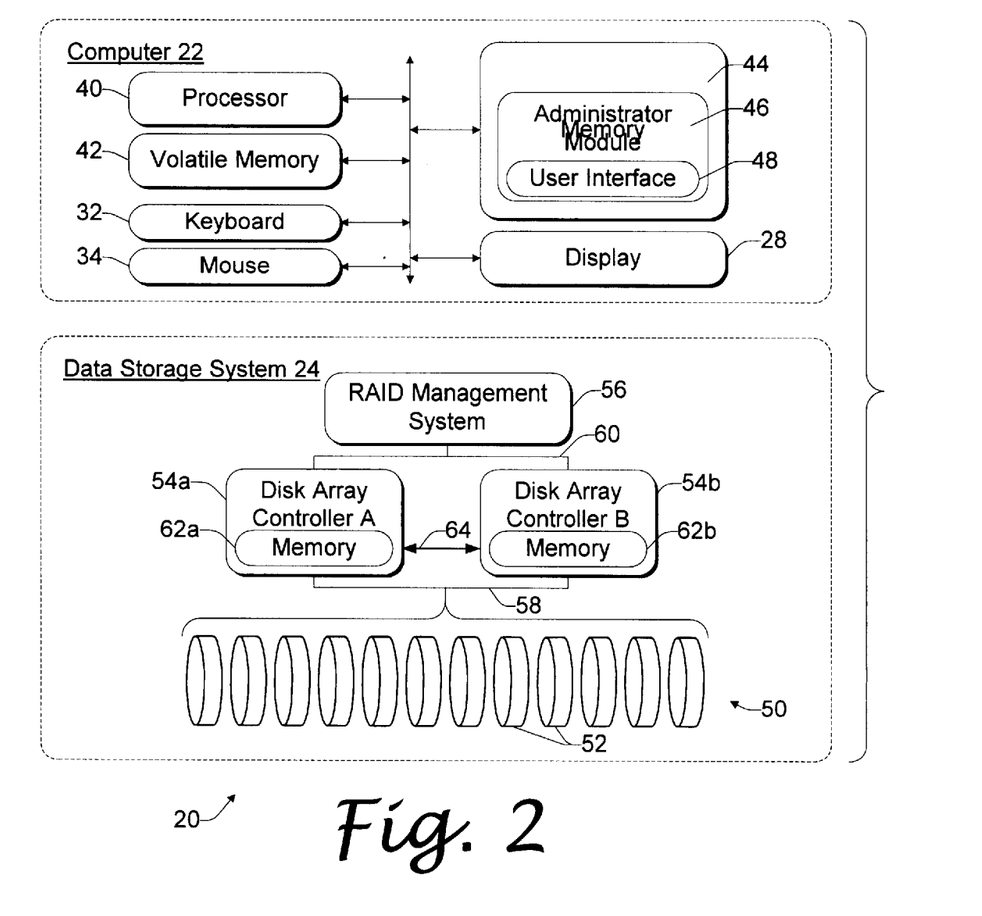
FIG. 2 is a block diagram of the host computer and data storage system. The data storage system is illustrated as a hierarchical RAID system.

FIG. 2 shows the host computer 22 and data storage system 24 in more detail. The computer 22 has a processor 40, a volatile memory 42 (i.e., RAM), a keyboard 32, a mouse 34, a non-volatile memory 44 (e.g., ROM, hard disk, floppy disk, CD-ROM, etc.), and a display 28. An administrator module 46 is stored in memory 44 and executes on processor 40. The administrator module 46 provides management functions such as diagnostics, performance review, LUN arrangement analysis, and capacity analysis. The administrator module 48 supports a storage manager graphical user interface (UI) 48 that presents a visual interface on the display 28.

The data storage system 24 has a disk array 50 with multiple storage disks 52, a disk array controller 54, and a RAID management system 56. The disk array controller 54 is coupled to the disk array 50 via one or more interface buses 58, such as a small computer system interface (SCSI). The RAID management system 56 is coupled to the disk array controller 54 via an interface protocol 60. It is noted that the RAID management system 56 can be embodied as a separate component (as shown), or within the disk array controller 54, or within the host computer 22. The RAID management system 56 is preferably a software module that runs on the processing unit of the data storage system 24, or on the processor 40 of the computer 22.

The disk array controller 54 coordinates data transfer to and from the disk array 50. The disk array controller 54 has two identical controller boards: a first disk array controller 54a and a second disk array controller 54b. The parallel controllers enhance reliability by providing continuous backup and redundancy in the event that one controller becomes inoperable. The parallel controllers 54a and 54b have respective mirrored memories 62a and 62b. The mirrored memories 62a and 62b are preferably implemented as battery-backed, non-volatile RAMs (NVRAMs). Although only dual controllers 54a and 54b are shown and discussed generally herein, aspects of this invention can be extended to other multi-controller configurations where more than two controllers are employed.

The mirrored memories 62a and 62b store several types of information. The mirrored memories 62a and 62b maintain duplicate copies of a cohesive memory map of the storage space in disk array 50. This memory map tracks where data and redundancy information are stored on the disk, and where available free space is located. The view of the mirrored memories is consistent across the hot-plug interface, appearing the same to external processes seeking to read or write data.

The mirrored memories 62a and 62b also maintain a read cache that holds data being read from the disk array 50. Every read request is shared between the controllers. The mirrored memories 62a and 62b further maintain two duplicative copies of a write cache. Each write cache temporarily stores data before it is written out to the disk array 50.

One particular implementation of a mirrored memory dual controller for a disk storage system is described in U.S. Pat. No. 5,699,510, entitled "Failure Detection System for a Mirrored Memory Dual Controller Disk Storage System," which issued Dec. 16, 1997 in the names of Petersen et al. and is assigned to Hewlett-Packard Company. This patent is incorporated by reference for background information pertaining generally to dual controller disk storage systems.

The controller's mirrored memories 62a and 62b are physically coupled via a hot-plug interface 64. In the absence of this invention, the hot-plug interface 64 introduces a possible problem in that single points of failure could corrupt both memories 62a and 62b. An aspect of this invention is to prevent such corruption, and to ensure that the two memories maintain correctly replicated images of the storage space. Generally, the controllers 62a and 62b monitor data transfers between them to ensure that data is accurately transferred and that transaction ordering is preserved (e.g., read/write ordering).

Figure 3:
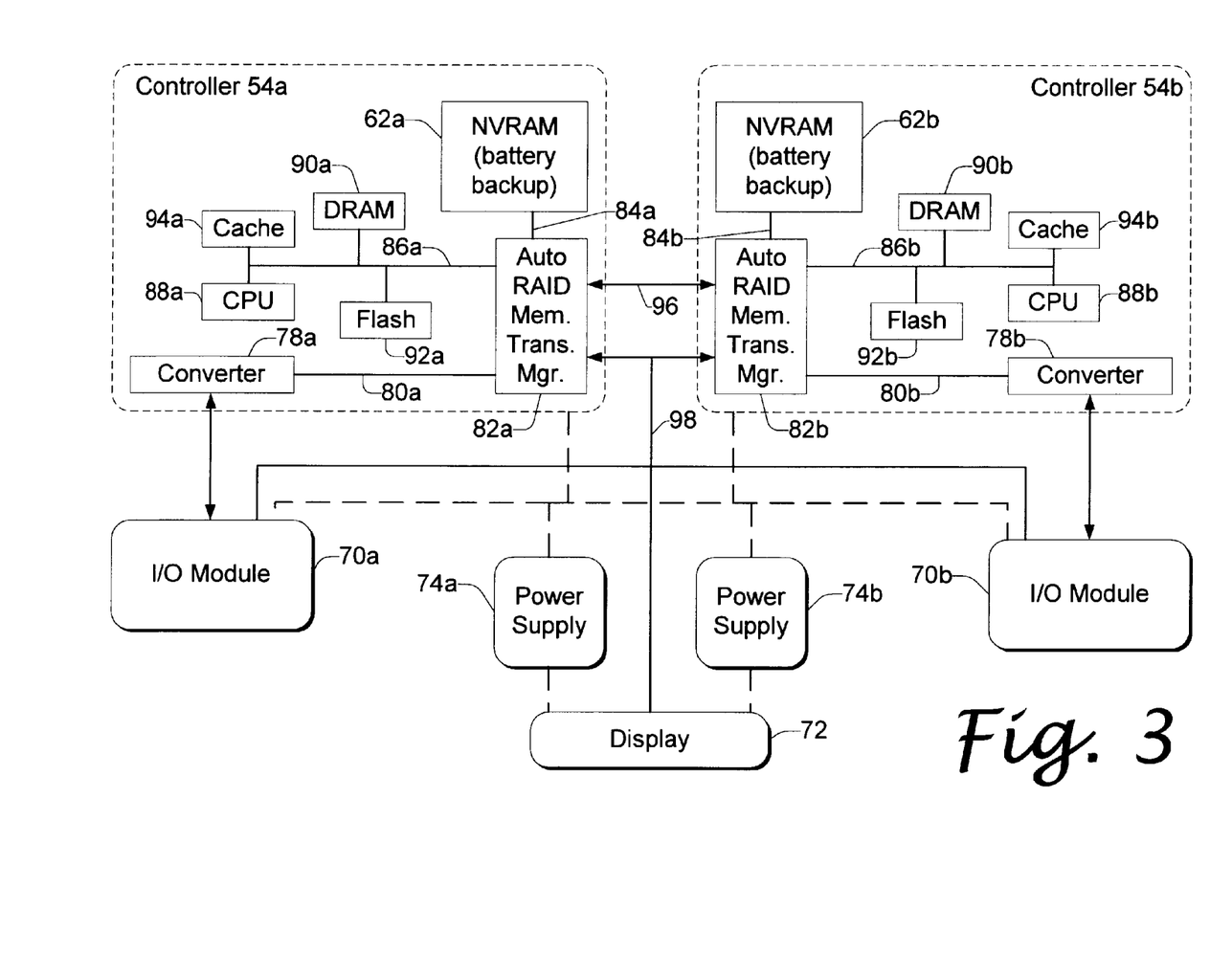
FIG. 3 is a block diagram of the mirrored memory disk array controller in the data storage system, embodied with two controllers.

FIG. 3 shows the dual disk array controller in more detail. In addition to the controller boards 54a and 54b, the disk array controller also has two I/O modules 70a and 70b, a display 72, and two power supplies 74a and 74b. The I/O modules 70a and 70b facilitate data transfer between drives. In one implementation, the I/O modules 70a and 70b employ fiber channel technology, although other bus technologies may be used. The power supplies 74a and 74b provide power to the other components in the disk array controller 54, including the controllers 54, the display 72, and the I/O modules 70.

Each controller 54a, 54b has a converter 78a, 78b connected to receive signals from the host via I/O module 70a, 70b. Each converter 78a and 78b converts the signals from one bus format (e.g., fiber channel) to another bus format (e.g., PCI). A first PCI bus 80a, 80b carries the signals to an AutoRAID memory transaction manager 82a, 82b, which handles all mirrored memory transaction traffic to and from the NVRAM 62a, 62b in the mirrored controller. The AutoRAID memory transaction manager maintains the memory map, computes parity, and facilitates cross-communication with the other controller. The AutoRAID memory transaction manager 82a, 82b is preferably implemented as an integrated circuit (e.g., an application-specific IC or ASIC).

The AutoRAID memory transaction manager 82a, 82b is coupled to the NVRAM 62a, 62b via a high-speed bus 84a, 84b and to other processing and memory components via a second PCI bus 86a, 86b. Each controller 54a, 54b has at least one CPU 88a, 88b and several types of memory connected to the PCI bus 86a and 86b. The memory include DRAM 90a, 90b, Flash memory 92a, 92b, and cache 94a, 94b.

The AutoRAID memory transaction managers 82a and 82b are coupled to one another via a hot-plug interface 64. The hot-plug interface 64 supports bi-directional parallel communication between the two AutoRAID memory transaction managers 82a and 82b at a data transfer rate commensurate with the NVRAM buses 84a and 84b.

The hot-plug interface 64 is implemented using a point-to-point bus 96 and I²C buses 98. The point-to-point bus 96 is a multi-bit bus that transports memory transaction data between the mirrored memory controllers 54a and 54b. The I²C buses 98 carry microprocessor communications, peripheral communications, and so forth.

The AutoRAID memory transaction managers 82a and 82b employ a high-level packet protocol to exchange transactions in packets over the bus 96 bus of the hot-plug interface 64. The AutoRAID memory transaction managers 82a and 82b perform error correction on the packets to ensure that the data is correctly transferred between the controllers.

The AutoRAID memory transaction managers 82a and 82b provide a memory image that is coherent across the hot plug interface 64. The managers 82a and 82b also provide an ordering mechanism to support an ordered interface that ensures proper sequencing of memory transactions.

Figure 4:
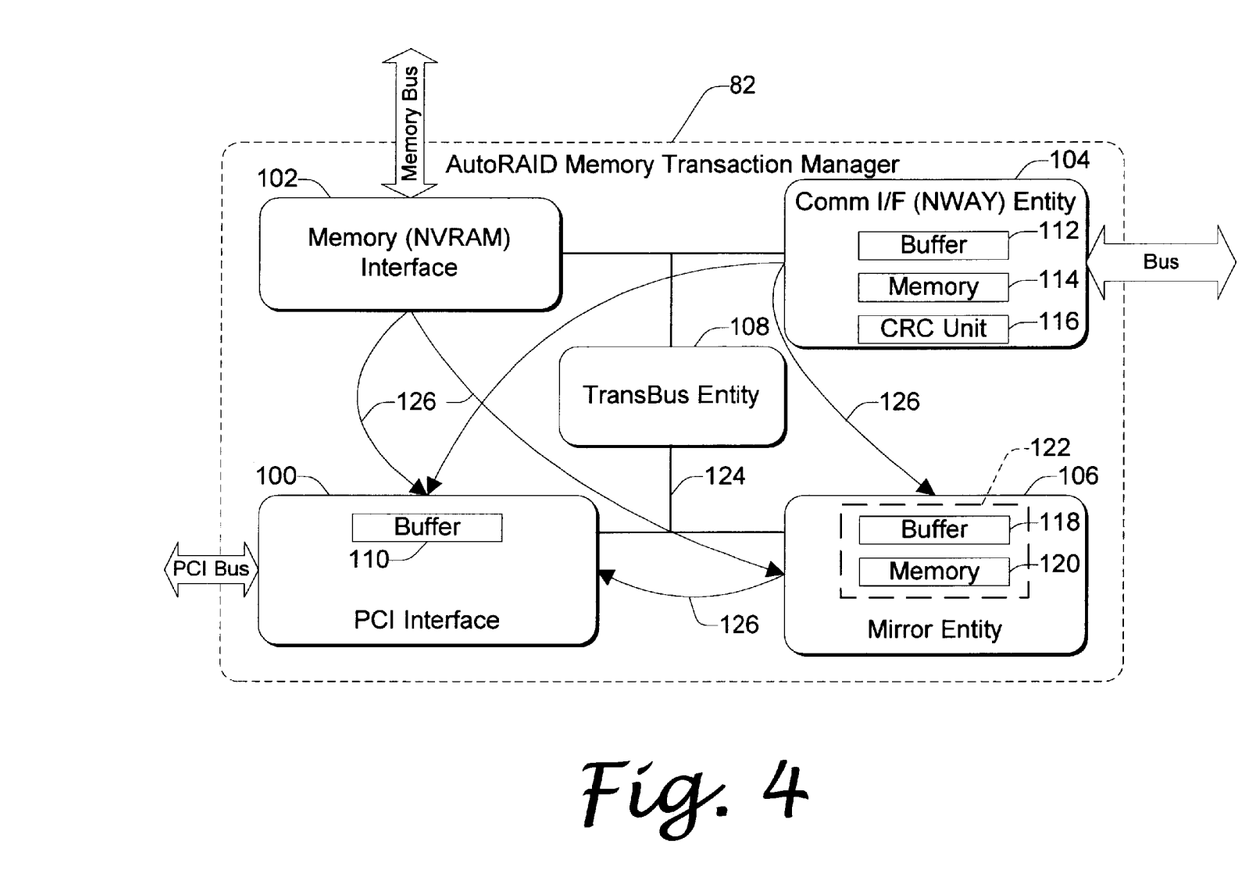
FIG. 4 is a generalized block diagram of an AutoRAID memory transaction manager.

FIG. 4 shows the AutoRAID memory transaction manager in more detail. For discussion purposes, the AutoRAID memory transaction manager is generally referenced as number 82, without the "a" and "b" designations. The AutoRAID memory transaction manager in FIG. 4 is representative of either component 82a or 82b, as both are identically constructed.

The AutoRAID memory transaction manager 82 has a PCI interface 100, an NVRAM interface 102, an NWay entity 104, a mirror entity 106, and a transbus entity 108. The PCI interface 100 facilitates data transfer over the PCI bus 80 to and from the I/O module 70 via the converter 78 and over PCI bus 86 to and from the CPU 88. The PCI interface 100 has one or more buffers 110 to temporarily hold transaction data being transferred to and from other entities in the memory transaction manager 82.

The NVRAM interface 102 handles read and write transaction requests and facilitates data transfer to and from the local NVRAM 62.

The NWay interface 104 facilitates transfer of remote memory transactions over the hot-plug interface between the controllers. As noted above, the transactions are transferred in packets, subject to error correction. The NWay interface 104 has one or more buffers 112 to hold transaction data, a data memory 114 to hold packets being exchanged across the hot-plug interface with the other controller, and a CRC unit 116 to perform error correction on individual or groups of packets.

The mirror entity 106 handles local and mirrored memory transactions and orders them via the transbus entity 108. The mirror entity accommodates such transactions as mirrored reads, mirrored writes, and local reads in a mirrored space. The mirror entity 106 has a buffer 118 and a data memory 120. A transaction queue 122 is formed in both or ones of the buffer 118 and data memory 120.

The transbus entity 108 enables the different components 100–106 to issue commands. The transbus entity 108, along with the transaction queue 122 in the memory entity 106, provide the ordering functionality that orders transactions received at the controller.

The transbus entity 108 controls a multiple access bus 124 that interconnects the four components 100–106. The PCI interface 100, the NWay interface 104 and the mirror entity 106 initiate transactions on the transbus entity 108 and all four components 100–106 receive transactions from the transbus entity 108. The transbus entity 108 identifies the source of the request (i.e., a source ID), an address of the access, and other attributes.

Data is moved between the four components 100–106 via callback buses 126. There is at least one callback bus 126 for each element of the manager 82. As shown, the PCI interface 100, the NWay interface 104, and the mirror entity 106 have a callback bus 126.

Unlike prior art controllers, however, the innovative RAID memory transaction manager 82 of the present invention incorporates a de-coupled architecture of initiators and targets, with dedicated transaction and data busses, enabling a controller incorporating the teachings of the present invention to concurrently process multiple transactions, traversing multiple clock synchronization boundaries. It will be shown that a controller incorporating the innovative transaction manager 82 supports concurrent transaction processing on all external interfaces and in internal data processing modules, while providing for mirrored transactions that move data to multiple destinations efficiently and with atomicity. Moreover, as will be described, the innovative transaction manager provides for high priority transactions which may be processed rapidly while still following ordering rules that provide for the timely execution and promotion of other transactions. With that introduction, a block diagram of the system architecture of the memory transaction manager 82 is presented with reference to FIG. 5.

Figure 5:
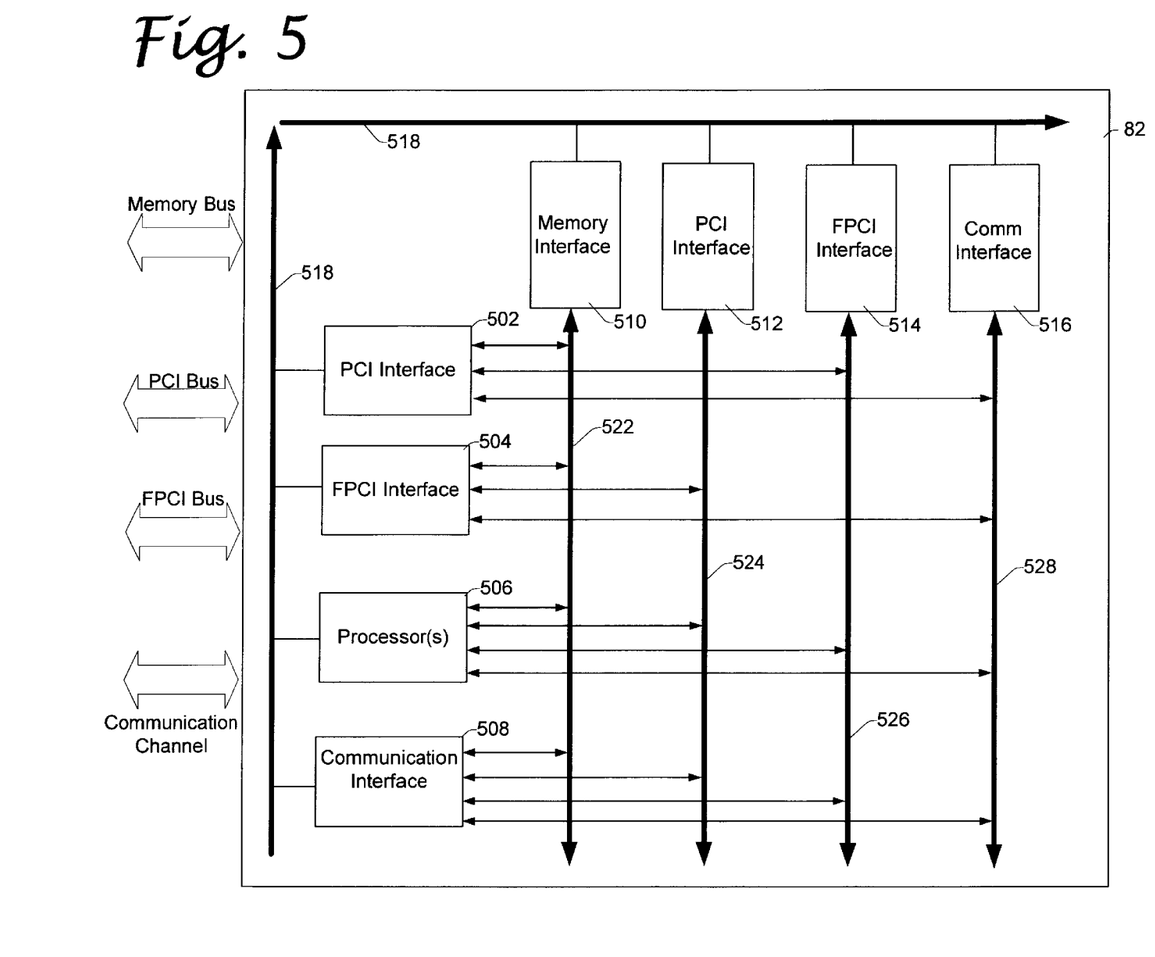
FIG. 5 is a more detailed block diagram of an AutoRAID memory transaction manager illustrating the communication paths between initiators and targets within the controller, according to one aspect of the present invention.

FIG. 5 illustrates a block diagram of the system architecture of the innovative AutoRAID Memory Transaction Manager 82, according to one embodiment of the present invention. In accordance with the illustrated example embodiment of FIG. 5, manager 82 is characterized as a de-coupled architecture comprised of initiators (502, 504, 506 and 508) coupled to targets (510, 512, 514 and 516) via a transaction bus 518, and a number of data busses 522, 524, 526 and 528 corresponding to the number of targets. As shown, the transaction manager 82 effectively accommodates a number of external and internal interfaces, each operating at a different clock speed. Examples of such interfaces include the PCI interface (33 MHz), the fast PCI (FPCI) interface (66 MHz), the communications channel (Other I/O) (100 MHz) and the memory interface (100 MHz). As will be described in greater detail below, the decoupled system architecture of the innovative transaction manager 82 effectively traverses the clock synchronization boundaries enabling multiple data movement operations across each of these interfaces.

With continued reference to FIG. 5, manager 82 is shown comprising a PCI initiator 502, a fast PCI (or FPCI) initiator 504, a processing unit(s) 506 and a communications interface initiator 508. In addition to the initiators 502–508, manager 82 is shown comprising memory (NVRAM) target 510, PCI target 512, FPCI target 514 and a communication interface target 516. As will be described in further detail below, the purpose of the initiator/target pairs is to de-couple the processing of data movement/processing transactions through manager 82, facilitating concurrent data movement and processing operations.

As used herein, the initiator(s) 502–508 receive transactions from external sources via one of the communication paths coupled to manager 82. If the transaction is received from an external bus (e.g., PCI, FPCI, Communication), it is placed into a write buffer (not shown) until the target is ready to promote the transaction. If, however, a target supplies data to the initiator, it is buffered in a read buffer (not shown) until such time as an external element reads the data from the read buffer (e.g., via the PCI bus, etc.). For example, PCI initiator 502 receives transactions via one or more PCI busses, while FPCI initiator 504 receives transactions via one or more FPCI busses. Similarly, communication interface initiator 508 receives transactions via one or more of the other I/O busses, i.e., bus 96. When a transaction is received from an external interface (e.g., a PCI interface) bound for another interface (e.g., an FPCI interface), the receiving initiator buffers the transaction and assigns it a unique identifier, which is sent to the target of the destination interface via the transaction bus 518. The initiator then awaits an indication from the target that it is ready to process the transaction before providing the target with the transaction data.

According to one aspect of the invention, introduced above, manager 82 incorporating the teachings of the present invention includes one or more processor(s) 506. As used herein, processor(s) 506 are intended to represent any of a broad category of processors and controllers known in the art. It will be appreciated by those skilled in the art that integration of processor 506 within manager 82 facilitates simultaneous data processing functions with data movement functions. In this regard, processor 506 reads data from memory and performs operations on the data, and then writes that data back to memory or to any device in the system, via targets 510–516. Thus, data processor 506 enables manager 82 to support data processing functionality concurrently with data movement transactions without adversely impacting the performance and integrity of other initiator/target functions, according to one aspect of the present invention.

In general, targets 510–516 receive transaction requests from initiators that include the unique identifier (e.g., CallerID). These targets each include one or more queues (not shown) that is used to schedule execution of the transactions. More specifically, targets 510–516 queue the unique identifiers received from the initiators or data processor 502–508. In one implementation, the queue is implemented in a modified First In, First Out (FIFO) manner, with leave for priority transactions.

In the modified FIFO implementation, targets 510–516 schedule performance of transactions in the order in which the unique identifier is added to the queue, i.e., the order received from initiators and data processor 502–508. One exception to this general FIFO rule is when a target 510–516 receives an indication of a priority transaction. In such an instance, processing of transactions from the queue is temporarily suspended while the target (510–516) carries out the priority transaction. In an alternate embodiment, a plurality of queues may be implemented to accommodate priority transactions. Any number of alternative methods may be used to denote a priority transaction including, but not limited to, setting a special bit in a data packet, assigning a global identifier (in addition to a unique identifier) which is predetermined to represent a priority transaction, and the like. Indeed, it is contemplated that an entire hierarchy of transaction types may well be implemented within manager 82 without deviating from the spirit and scope of the present invention.

Memory target 510 handles the reading from and writing to memory coupled to manager 82 by the memory bus. More specifically, memory target 510 schedules transaction requests received from initiators and/or data processor 502–508 directed to the NVRAM 62. With the above exception for priority transactions, memory target 510 pops transaction identifiers from the transaction queue and issues a request for the transaction data from the initiator(s)/data processor 502–508. According to one embodiment, memory target 510 requests the transaction data from the initiator(s)/data processor 502–508 by placing the transaction identifier on the callback bus 522, whereupon the initiators/data processor 502–508 decode the identifier to match it against transactions it has pending (in the write buffer). The appropriate initiator then supplies the memory target with the transaction data to complete the transaction. Alternatively, if it is a read transaction, once the transaction identifier reaches the top of the queue, the memory target accesses and retrieves the requested data from memory. The data is then supplied to the requesting initiator, which reads the data into a read buffer (not shown).

It is to be appreciated that although FIG. 5 has been described in terms of initiator(s) and target(s), this is for ease of explanation only. In one implementation it may hold that separate physical devices are utilized as initiators and targets. In an alternate embodiment, common communication interfaces are used that perform the functions of initiator and target on a per-transaction basis. That is, these definitions of initiator and target are defined within the context of each transaction. Thus, an interface may be defined as an initiator with respect to a first transaction, and a target with respect to a second transaction.

Further, it is to be appreciated that FIG. 5 may well be implemented in software, where executable instructions are utilized to implement the functional elements depicted in FIG. 5. In yet another embodiment, the innovative transaction manager 82 of FIG. 5 is a series of design instructions which, when executed, cause a process to produce an integrated circuit including the functional elements of FIG. 5. In one embodiment, the design instructions are coded in Verilog, or some other suitable design language. Each of the foregoing embodiments are anticipated within the scope and spirit of the present invention.

Figure 6:
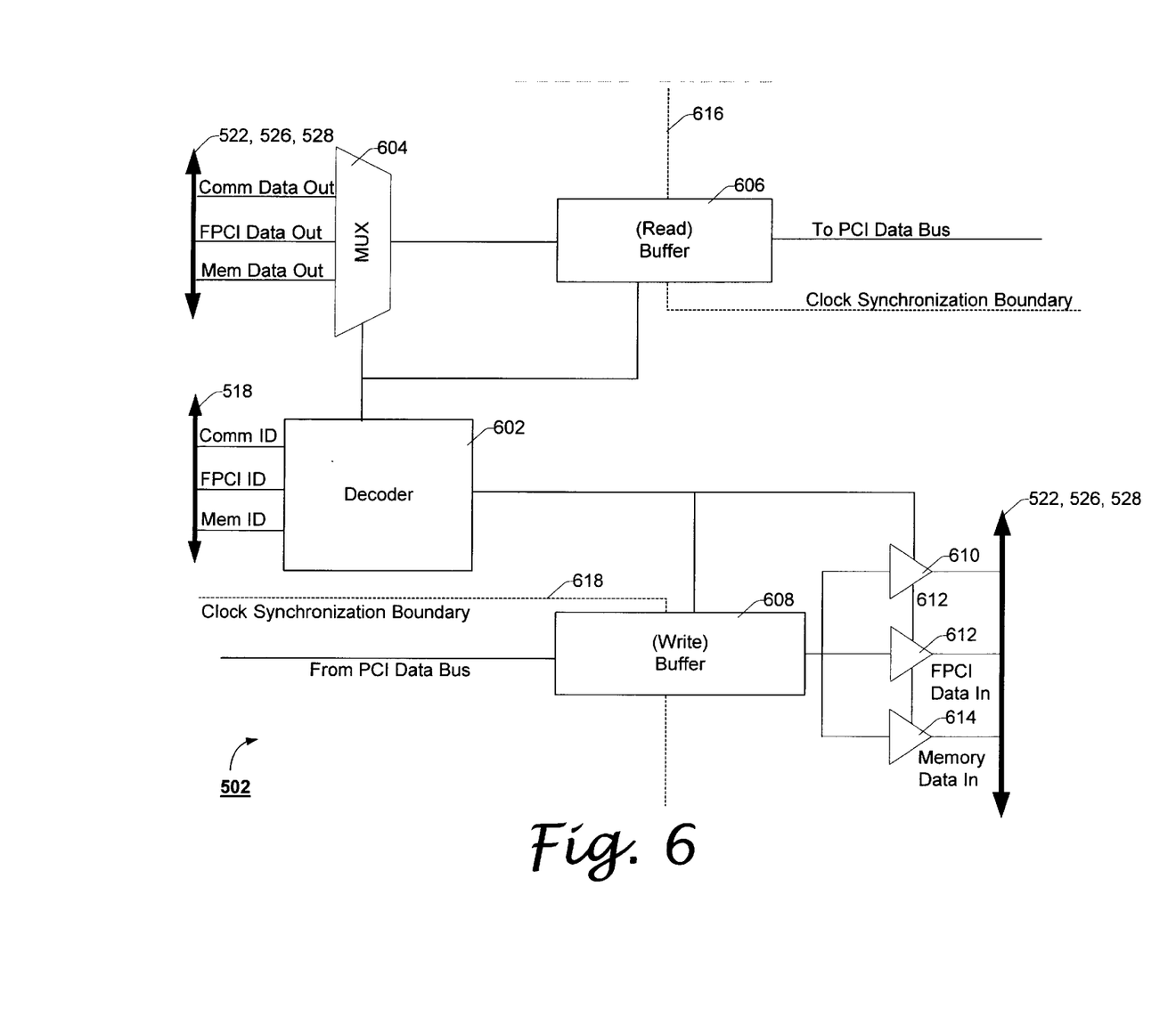
FIG. 6 is a block diagram illustrating example control logic to facilitate multiple data movement operations across clock synchronization boundaries, according to the teachings of the present invention.

Having introduced select functional blocks and the general operation of the innovative transaction manager 82 with reference to FIGS. 4 and 5, above, FIG. 6 provides a block diagram of an example initiator in greater detail to further illustrate the operation of innovative manager 82. More specifically, FIG. 6 illustrates a block diagram of an example PCI initiator 502 in greater detail, according to one embodiment of the present invention.

As shown, PCI initiator 502 comprises a decoder 602, a multiplexer 604, buffers 606 and 608, and a tri-state buffer (610, 612, 614), coupled as depicted. In addition, for purposes of illustration and explanation, clock synchronization boundaries 616 and 618 are depicted with dashed lines. The purpose of the dashed lines are to clearly depict that the clock synchronization boundary is not a physical element of the initiator 502, but rather a logical boundary between a first set of elements that operate at one clock speed and second set of elements that operate at a second clock speed. The elements may be a communication bus, or logic coupled to initiator 502 via a communication bus. In either case, as will be described in greater detail below, initiator 502 provides a means promoting transactions between elements having disparate communication rates, i.e., between a PCI bus clocking at 33 MHz and a FPCI bus clocking at 66 MHz. In this regard, according to one aspect of the present invention, an initiator of innovative manager 82 provides a means of traversing clock synchronization boundaries without the need to actually synchronize these interfaces.

In the illustrated example PCI initiator embodiment, buffer 608 is used to receive transactions from an external PCI bus until an appropriate target indicates that it is ready to process the transaction. In one implementation, buffer 608 is referred to as a write buffer. Conversely, buffer 606 is employed to receive data from a target (510, 514, 516) for promotion to an external PCI bus. As will be described more fully below, promoting transaction data from write buffer 608 to an appropriate target, or transferring data received from a target in the read buffer 606 to an external PCI bus requires the assertion of an enable line by decoder 602.

Decoder 602 is used to decode received transaction identifiers (CallerID) from targets to determine whether the initiator is buffering the identified transaction. If the initiator 502 is buffering transaction data in write buffer 608, denoted by receipt of a unique identifier associated with data in a local buffer, decoder 602 enables the write buffer (608) and an appropriate output 610–614 of tri-state buffer to provide the requesting target with the buffered transaction data. Similarly, to enable a target to issue data to an external PCI data bus, decoder 602 must receive an appropriate identifier to enable the multiplexer 604 to populate read buffer 606 with the data. The data from read buffer 606 is read by a system element via the PCI bus at the clock speed of the PCI bus. The use of the PCI initiator 502 in this way enables an element coupled to manager 82 via a PCI bus clocking at 33 MHz to retrieve data residing in NVRAM which is coupled to manager 82 via an interface clocking at 100 MHz.

Having introduced the functional elements of manager 82 and an initiator, the general operation of the innovative transaction manager will now be described with reference to the flow chart of FIG. 7.

Figure 7:
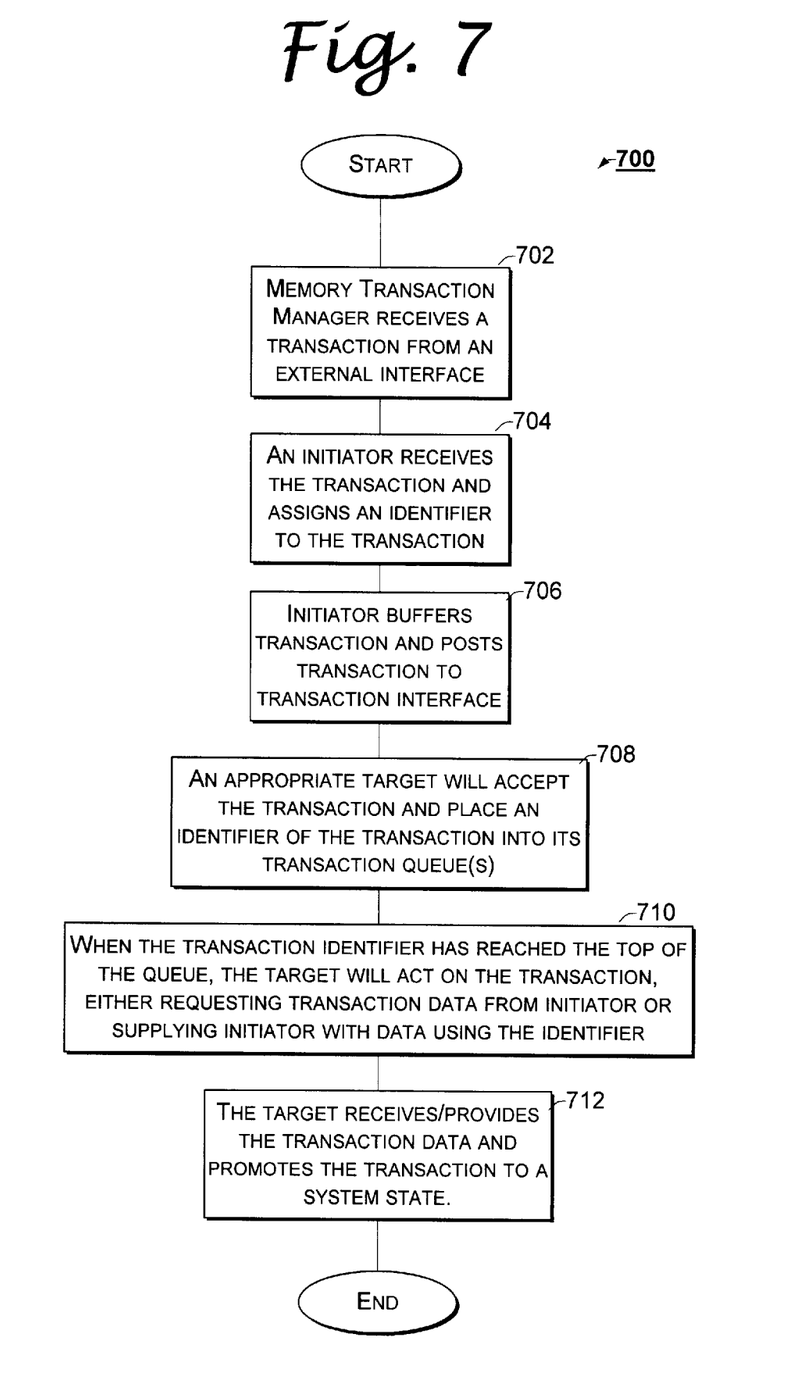
FIG. 7 is a flow chart illustrating an example method for performing multiple data movement operations, according to one embodiment of the present invention.

Turning to FIG. 7, a flow chart illustrating an example method for concurrently operating on multiple data movement operations is presented, according to one embodiment of the present invention. As shown, the method begins with step 702 wherein the transaction manager 82 receives a transaction from an external interface (80, 84, 86, 96, 98). An initiator (502, 504, 508) associated with the interface, or the data processor 506, receives the transaction and assigns a unique identifier to the transaction. As described above, the unique identifier is referred to as a CallerID, and may denote the calling initiator as well as the transaction.

Write Transaction

In step 706, the initiator/data processor (502–508) buffers the transaction in a write buffer (608) and posts the transaction to an appropriate target (510–516) via the transaction bus 518. As described above, the target is identified by an address, register content, etc. In response to the posting, an accepting target (510–516) loads the unique identifier in a local transaction queue, step 708. According to one implementation, the target (510–516) employs a modified FIFO transaction queue wherein transactions are handled in the order in which they are received, with the provision for immediate handling of priority transactions.

When the transaction identifier has reached the top of the queue of the target (510–516), the target will act on the transaction, either requesting transaction data from an appropriate initiator/data processor (502–508), or providing the appropriate initiator with data, step 710. As described above, the actions of the targets 510–516 and the initiators/data processor 502–508 are coordinated via the transaction identifier. Consequently, as described above, when the transaction identifier has reached the top of the transaction queue of a target 510–516, the target issues the transaction identifier on the callback bus 522 to the initiators/data processor 502–508 to denote that the target is now ready to complete the transaction. The decoder (602) of the initiators/data processor 502–508 identify that the transaction identifier received from the callback bus 522 is associated with their pending transaction. In response to receiving one of their own transaction identifiers, the initiator either enables the mux 604 to receive data from the target (510–516), or enables an appropriate one of the tri-state buffer (610–614) to supply the target (510–516) with transaction data from write buffer 608 via an appropriate one of data lines 522–528.

In step 712, the target receives/provides the transaction data and the transaction is promoted to a system state.

It should be noted that although the flow chart of FIG. 7 is depicted in a sequential manner, the de-coupled system architecture of manager 82 enables the targets (510–516) to constantly be receiving transaction identifiers from any initiator/data processor (502–508). Since a particular target is not directly tied to a particular initiator, each initiator/data processor can simply issue a transaction identifier to a target and buffer the transaction, as it accepts and acts on another transaction. As the target is able to process the transactions, it accesses the requesting initiator/data processor using the transaction identifier. In this way, the initiator(s)/data processor can accommodate transactions at a rate independent of the ability of the target to complete such transactions, limited only by the buffer space available within the initiator/data processor.

Having introduced the operation within the innovative memory transaction manager 82, several transactions are described below to exemplify operation of the disk array controller 54 at a system level. These transactions will be described in the following order: mirrored read, local read, mirrored write, and concurrent writes. The transactions are described in the context of the dual controllers with reference to FIGS. 3 and 4. However, the transactions may be performed in other multi-controller implementations involving more than two controllers.

Mirrored Read

In a mirrored read request, the controllers 54a and 54b use the memory map in the mirrored memories 62 and 62b to locate the requested data on the disk array. The data is then stored temporarily in the read cache maintained in the mirrored memories 62a and 62b. Suppose that controller 54a receives a request from the host via I/O module 70a to read data from the disk array. The controller CPU 88a processes the request and generates a mirrored read request that involves reading data from the mirrored memories 62a and 62b. The mirrored read request is sent to the PCI interface 100 of the AutoRAID memory transaction manager 82a.

In this example, the first controller 54a and its AutoRAID memory transaction manager 82a are referred to as the "local" controller and manager because they receive and originate the mirrored read request. The second controller 54b and its AutoRAID memory transaction manager 82b are referred to as the "remote" controller and manager. In this mirrored read transaction, the local and remote managers perform the following steps:

Step 1: The PCI interface 100 makes a request to the transbus entity 108 via the bus 124 for a particular piece of data. The request includes a unique identifier memory address, the number of bytes, and indication that it is a read operation, and so forth.

Step 2: The mirror entity 106 accepts the request from the transbus entity 108 as its own and places the request in the transaction queue 122. The queue 122 maintains order over various requests that are being handled on the local manager 82a.

Step 3: When the request moves to the top of the queue 122, the mirror entity 106 makes a request to the transbus entity 108 for the NWay entity 104 to obtain the mirrored copy of data from the remote memory transaction manager 82b. The request from the mirror entity 106 includes the same information (i.e., memory address, byte number, etc.) as found in the original request made in Step 1 by the PCI interface.

Step 4: The NWay entity 104 packages the read request in a packet and computes a CRC value for the packet using the CRC unit 116. The NWay entity 104 transfers the read request packet over the NWay bus 96 to the corresponding NWay entity in the remote AutoRAID memory transaction manager 82b.

Step 5: The remote NWay entity checks the CRC value to ensure valid transfer and makes a request via the remote transbus entity to the remote NVRAM interface to read the particular piece of data. The remote NWay entity returns an acknowledgement to the local NWay entity 104 indicating that the request was properly received and has been posted for execution.

Step 6: Concurrently with step 5, the local NWay entity 104 makes a request to the local NVRAM interface 102 via the transbus entity 108, Nway uses the mirror unique ID and NVRAM responds to mirror to read the particular piece of data.

Step 7: The local and remote NVRAM interfaces concurrently retrieve the same piece of data from their respective NVRAMs 62a and 62b. The local NVRAM interface 102 places the data on the callback bus 126. The remote NVRAM interface places the data on a callback bus that is being monitored by the remote NWay entity, which then makes a request to the remote NWay entity to transfer the data to the local manager 82a. The remote NWay entity packages the data, detects and facilitates error correction and transfers the packet across the NWay bus 96 to the local NWay entity 104.

Step 8: The local NWay entity 104 checks the CRC value to ensure valid transfer and posts the data on its callback bus 126.

Step 9: In the mean time, the local mirror entity 106 that originated the read request watches the callback buses 126 from the NVRAM interface 102 and the NWay entity 104. When the local data is received from the NVRAM interface 102 and the remote copy is received from the NWay entity 104, the mirror entity 106 compares the two version to make sure they match. A match indicates that the data is valid.

Step 10: Assuming the data is valid, the mirror entity 106 places the data on the callback bus 126 back to the PCI interface 100. The PCI interface 100 is monitoring the callback buses because it does not known where the data is coming from (e.g., whether from the mirror entity or the NVRAM interface). The PCI interface 100 then transfers the results back to the CPU or to the converter for return to the host.

Local Read

Suppose that controller 54a receives a read request that does not require a read compare operation. The local controller 54a can read the data from its own memory without requesting the copy from the remote controller. In the local read transaction, the local AutoRAID memory transaction manager performs the following steps:

Step 1: The PCI interface 100 makes a request to the transbus entity 108 via the bus 124 for a piece of data on the local NVRAM 62a. The request includes a memory address, the number of bytes, and indication that it is a read operation, and so forth.

Step 2: The mirror entity 106 accepts the request from the transbus entity 108 as its own and places the request in the transaction queue 122. In this manner, the local reads are handled in order with other types of transactions, including the mirrored read transactions described above.

Step 3: When the request moves to the top of the queue 122, the mirror entity 106 makes the local read request to the transbus entity 108. The NVRAM interface 102 accepts the request and retrieves the data from the NVRAM 62a. The NVRAM interface 102 places the data on its callback bus 126.

Step 4: The PCI interface 100 is watching the callback bus 126 for the returned data. The PCI interface 100 then transfers the results back to the CPU or to the converter for return to the host.

Mirrored Write

The controllers 54a and 54b handle a mirrored write request by (1) storing the data in the write cache maintained in the mirrored memories and (2) updating the memory map in the mirrored memories. Suppose that controller 54a receives a write request to write data to a particular location on the disk array. The write request is received at the PCI interface 100 from the PCI bus. The local and remote AutoRAID memory transaction managers then perform the following steps:

Step 1: The PCI interface 100 makes a write request to the transbus entity 108 via the bus 124. The request includes a memory address, a pointer to the data to be written, an indication that it is a mirrored write operation, and so forth.

Step 2: The mirror entity 106 accepts the write request from the transbus entity 108 and places the request in the transaction queue 122. Once again, the transaction queue 122 maintains order among the various memory transactions.

Step 3: When the request moves to the top of the queue 122, the mirror entity 106 places the write request back on the transbus entity 108 for acceptance by the NWay entity 104. At this point, the mirror entity 106 is finished with the process.

Step 4: The NWay entity 104 packages the write request in a packet and computes a CRC value for the packet using the CRC unit 116. The NWay entity 104 transfers the write request packet over the NWay bus 96 to the corresponding NWay entity in the remote AutoRAID memory transaction manager 82b.

Step 5: The remote NWay entity checks the CRC value to ensure valid transfer and makes a request via the remote transbus entity to the remote NVRAM interface to read the particular piece of data. The remote NWay entity returns an acknowledgement to the local NWay entity 104 indicating that the request was properly received and has been posted for execution.

Step 6: Upon receiving an acknowledgement, the local NWay entity 104 makes a request to the local NVRAM interface 102 via the transbus entity 108 to write the data to the write cache in the mirrored memory 62a.

Step 7: The local and remote NVRAM interfaces write the same data to the write caches in their respective NVRAMs 62a and 62b. The local NVRAM interface 102 puts an acknowledgement on the callback bus 126 when the write is completed.

Step 8: The local PCI interface 100 monitors the callback bus for the acknowledgement from the NVRAM interface 102.

Concurrent Writes

The last exemplary transactions involves a situation in which the CPU 88a on the local controller 54a requests a write to a specific memory location and the CPU 88b on the remote controller 54b requests a write to the same memory location. In this situation, the mirrored memory disk array controller is designed to ensure that write requests are ordered and fully completed. To do this, the dual controllers 54a and 54b assume roles of master/slave or primary/secondary, whereby one controller is crowned with the tasks of ordering transactions and the other controller agrees to abide by this ordering. Determining which controller is the master or primary can be handled ahead of time, as part of a preconfiguration process, or can be negotiated by the controllers when such situations arise.

For purposes of illustration, suppose that local controller 54a is the master or primary controller and remote controller 54b is the slave or secondary controller. The write requests are received at the respective PCI interfaces of the master and slave AutoRAID memory transaction managers 82a and 82b from the PCI bus. The master and slave AutoRAID memory transaction managers 82a and 82b then perform the following steps:

Step 1: At each manager, the PCI interfaces make a write request to the transbus entities. The request includes a unique identifier, memory address, a pointer to the data to be written, an indication that it is a mirrored write operation, and so forth.

Step 2: The mirror entities accept the write requests from the transbus entities and place the requests in their transaction queues.

Step 3: When the requests move to the tops of the queues, the mirror entities place the write requests back on the transbus entities for acceptance by the NWay entities. Step 4: The NWay entities transfer the write requests as CRC-protected packets over the NWay bus 96 to the opposing NWay entities. Acknowledgements of receipt are also exchanged.

Step 5: Concurrently with step 4, the local and remote NWay entities also make requests to their respective NVRAM interfaces via the transbus entities to write the data to the write caches in the mirrored memories 62a and 62b. As a result of steps 4 and 5, the two write transactions will be posted to the transbus entities within the AutoRAID memory transaction manager. The order of these write transactions is controlled by their order on the transbus entities of the "master" controller, which in this case is controller 54a. Accordingly, if the write request received locally at the master controller 54a is posted first to the local transbus entity 108 before the write request from the remote (or slave) controller 54a is posted, the locally received write request is processed first. Conversely, if the write request received locally at the master controller 54a is posted to the local transbus entity 108 after the other write request from the remote (or slave) controller 54a is posted, the remotely received write request is processed first. The slave AutoRAID memory transaction manager abides by this ordering.

Step 6: The local and remote NVRAM interfaces write the data in the winning write request to the write caches in their respective NVRAMs 62a and 62b. The NVRAM interfaces place respective acknowledgements on their callback buses when the write is completed.

Step 7: The PCI interfaces monitor the callback buses for the acknowledgement.

Atomicity

The mirrored read and write transactions described above are handled atomically across the hot-plug interface. The controllers are designed to either perform the read and write operations for both NVRAMs, or to abort performance for both NVRAMs. In this manner, the images presented in the NVRAMs remain identical.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A controller comprising:
   a plurality of external communication interfaces;
   a plurality of initiators, logically linked to at least a corresponding subset of the external interfaces, to receive transactions from the external interfaces, generate an identifier of the received transaction, and buffer the transaction; and
   a plurality of targets, logically linked to at least a corresponding subset of the external interfaces, to concurrently receive the transaction identifiers from one or more of the plurality of initiators and concurrently process the transactions associated with the transition identifiers,
   wherein each target is configured to store plural transaction identifiers corresponding to plural respective transactions that are to be processed, and to schedule the execution of the plural respective transactions based on an ordering of the stored plural transaction identifiers.

2. A controller according to claim 1, wherein each target maintains one or more transaction queue(s), where transaction identifiers are stored and processed in the order received to thereby schedule execution of the plural transactions.

3. A controller according to claim 2, wherein the one or more transaction queue(s) employ a modified First In, First Out (FIFO) process order.

4. A controller according to claim 3, wherein the FIFO process is suspended upon receipt of a priority transaction.

5. A controller according to claim 1, wherein the targets and initiators are logical definitions applied on a per-transaction basis.

6. A controller according to claim 1, further comprising:
   one or more processors, operatively coupled to the initiators and the targets, to concurrently perform data processing operations on data within the controller.

7. A controller according to claim 1, wherein each of the initiators comprises a write buffer, to receive transaction data from an associated external interface, and supply the data to any target identified in the transaction independent of other transactions being processed by other initiators or targets.

8. A controller according to claim 7, wherein the buffer traverses synchronization boundaries, facilitating data movement across otherwise asynchronous communication interfaces.

9. A controller according to claim 1, wherein the targets are configured to process transactions by posting, when scheduled, the transaction identifiers on a bus, and the initiators are configured to respond to the transaction identifiers by supplying transaction data to the targets.

10. A controller comprising:

a plurality of external communication interfaces;

a plurality of initiators, logically linked to at least a corresponding subset of the external interfaces, to receive transactions from the external interfaces, generate an identifier of the received transaction, and buffer the transaction; and a plurality of targets, logically linked to at least a corresponding subset of the external interfaces, to concurrently receive the transaction identifiers from one or more of the plurality of initiators and concurrently process the transactions associated with the transition identifiers, wherein the targets and initiators are logical definitions applied on a per-transaction basis, and wherein a target is defined as such in a first transaction, but is an initiator for a second transaction.

11. A controller according to claim 10, wherein each target maintains one or more transaction queue(s), where transaction identifiers are stored and processed in the order received.

12. A controller according to claim to claim 11, wherein each target is configured to process transactions in the order in which transaction identifiers are retrieved from the one or more transaction queue(s) by issuing the transaction identifiers to respective initiators.

13. A controller according to claim 11, wherein the one or more transaction queue(s) employ a modified First In, First Out (FIFO) process order.

14. A controller according to claim 13, wherein the FIFO process is suspended upon receipt of a priority transaction.

15. A controller according to claim 10, further comprising:

one or more processors, operatively coupled to the initiators and the targets, to concurrently perform data processing operations on data within the controller.

16. A controller according to claim 10, wherein each of the initiators comprises a write buffer, to receive transaction data from an associated external interface, and supply the data to any target identified in the transaction independent of other transactions being processed by other initiators or targets.

17. A controller according to claim 16, wherein the buffer traverses synchronization boundaries, facilitating data movement across otherwise asynchronous communication interfaces.

18. A controller comprising:

a plurality of external communication interfaces;

a plurality of initiators, logically linked to at least a corresponding subset of the external interfaces, to receive transactions from the external interfaces, generate an identifier of the received transaction, and buffer the transaction; and a plurality of targets, logically linked to at least a corresponding subset of the external interfaces, to concurrently receive the transaction identifiers from one or more of the plurality of initiators and concurrently process the transactions associated with the transition identifiers, wherein the initiators are coupled to each target via a common transaction bus and a data bus dedicated to the target.

19. A controller according to claim 18, wherein a target notifies an initiator that it is ready to process a transaction when a transaction identifier has made it to the top of a transaction queue of the target by posting the transaction identifier on the transaction bus.

20. A controller according to claim 18, wherein each target maintains one or more transaction queue(s), where transaction identifiers are stored and processed in the order received.

21. A controller according to claim to claim 20, wherein each target is configured to process transactions in the order in which transaction identifiers are retrieved from the one or more transaction queue(s) by issuing the transaction identifiers to the initiators.

22. A controller according to claim 20, wherein the one or more transaction queue(s) employ a modified First In, First Out (FIFO) process order.

23. A controller according to claim 22, wherein the FIFO process is suspended upon receipt of a priority transaction.

24. A controller according to claim 18, further comprising:

one or more processors, operatively coupled to the initiators and the targets, to concurrently perform data processing operations on data within the controller.

25. A controller according to claim 18, wherein each of the initiators comprises a write buffer, to receive transaction data from an associated external interface, and supply the data to any target identified in the transaction independent of other transactions being processed by other initiators or targets.

26. A controller according to claim 25, wherein the buffer traverses synchronization boundaries, facilitating data movement across otherwise asynchronous communication interfaces.

27. A system including a redundant array of independent disks (RAID) comprising a controller, the system comprising:

a plurality of external communication interfaces;

a plurality of initiators, logically linked to at least a corresponding subset of the external interfaces, to receive transactions from the external interfaces, generate an identifier of the received transaction, and buffer the transaction; and a plurality of targets, logically linked to at least a corresponding subset of the external interfaces, to concurrently receive the transaction identifiers from one or more of the plurality of initiators and concurrently process the transactions associated with the transition identifiers, wherein each target is configured to store plural transaction identifiers corresponding to plural respective transactions that are to be processed, and to schedule the execution of the plural respective transactions based on an ordering of the stored plural transaction identifiers.

28. A system according to claim to claim 27, wherein the targets are configured to process transactions by posting, when scheduled, the transaction identifiers on a bus, and the initiators are configured to respond to the transaction identifiers by supplying transaction data to the targets.

29. A storage medium having stored thereon a plurality of executable instructions which, when executed, implement a controller, the storage medium comprising:

stored instructions to implement a plurality of external communication interfaces;

stored instructions to implement a plurality of initiators, logically linked to at least a corresponding subset of the external interfaces, to receive transactions from the external interfaces, generate an identifier of the received transaction, and buffer the transaction; and stored instructions to implement a plurality of targets, logically linked to at least a corresponding subset of the external interfaces, to concurrently receive the transaction identifiers from one or more of the plurality of initiators and concurrently process the transactions associated with the transition identifiers, wherein each target is configured to store plural transaction identifiers corresponding to plural respective transactions that are to be processed and to schedule the execution of the plural respective transactions based on an ordering of the stored plural transaction identifiers.

30. A storage medium according to claim 29, wherein the targets are configured to process transactions by posting, when scheduled, the transaction identifiers on a bus, and the initiators are configured to respond to the transaction identifiers by supplying transaction data to the targets.

31. A storage medium having stored thereon a plurality of design instructions which, when executed, cause a process to produce an integrated circuit that provides a controller, the storage medium comprising:

stored instructions that produce a plurality of external communication interfaces;

stored instructions that produce a plurality of initiators, logically linked to at least a corresponding subset of the external interfaces, to receive transactions from the external interfaces, generate an identifier of the received transaction, and buffer the transaction; and stored instructions that produce a plurality of targets, logically linked to at least a corresponding subset of the external interfaces, to concurrently receive the transaction identifiers from one or more of the plurality of initiators and concurrently process the transactions associated with the transition identifiers, wherein each target is configured to store plural transaction identifiers corresponding to plural respective transactions that are to be processed and to schedule the execution of the plural respective transactions based on an ordering of the stored plural transaction identifiers.

32. A storage medium according to claim 31, wherein the targets are configured to process transactions by posting, when scheduled, the transaction identifiers on a bus, and the initiators are configured to respond to the transaction identifiers by supplying transaction data to the targets.

33. A method for concurrently operating on multiple transactions in a RAID controller, the method comprising the steps of:

receiving a plurality of transactions at a corresponding plurality of initiators;

buffering the received transactions and generating a transaction identifier associated with the transaction at each of the initiators; and notifying one or more targets of the received transactions by the initiators by providing the transaction identifier, enabling the targets to process the transactions in the order in which they receive the tractions identifiers from the initiators, wherein each target is configured to store plural transaction identifiers corresponding to plural respective transactions that are to be processed, and schedules the execution of the plural respective transactions based on an ordering of the stored plural transaction identifiers.

34. A method according to claim 33, wherein the targets queue the transaction identifiers received from the initiators in one or more transaction queue(s) to thereby schedule execution of the plural transactions.

35. A method according to claim 34, wherein the one or more transaction queue(s) employ a modified first in, first out (FIFO) process, providing for immediate processing of received priority transactions.

36. A method according to claim 33, wherein the targets are configured to process transactions by posting, when scheduled, the transaction identifiers on a bus, and the initiators are configured to respond to the transaction identifiers by supplying transaction data to the targets.

37. A method for concurrently operating on multiple transactions in a RAID controller, the method comprising the steps of:

receiving a plurality of transactions at a corresponding plurality of initiators;

buffering the received transactions and generating a transaction identifier associated with the transaction at each of the initiators; and notifying one or more targets of the received transactions by the initiators by providing the transaction identifier, enabling the targets to process the transactions in the order in which they receive the tractions identifiers from the initiators, wherein the targets queue the transaction identifiers received from the initiators in one or more transaction queue(s), and wherein the targets process transactions in the order in which transaction identifiers are retrieved from the transaction queue by issuing the transaction identifier to the initiators.

38. A method according to claim 37, wherein the initiators decode the transaction identifier received from targets to determine whether they originated the transaction identifier and, if so, supplying the issuing target with transaction data enabling the target to process the transaction.

39. A method according to claim 37, wherein the one or more transaction queue(s) employ a modified first in, first out (FIFO) process, providing for immediate processing of received priority transactions.

40. A storage medium having stored thereon a plurality of executable instructions which, when executed implement a method comprising:

receiving a plurality of transactions at a corresponding plurality of initiators;

buffering the received transactions and generating a transaction identifier associated with the transaction at each of the initiators; and notifying one or more targets of the received transactions by the initiators by providing the transaction identifier, enabling the targets to process the transactions in the order in which they receive the tractions identifiers from the initiators wherein each target is configured to store plural transaction identifiers corresponding to plural respective transactions that are to be processed, and schedules the execution of the plural respective transactions based on an ordering of the stored plural transaction identifiers.

41. A storage medium according to claim 40, wherein the targets are configured to process transactions by posting, when scheduled, the transaction identifiers on a bus, and the initiators are configured to respond to the transaction identifiers by supplying transaction data to the targets.

* * * * *